Figure 4:
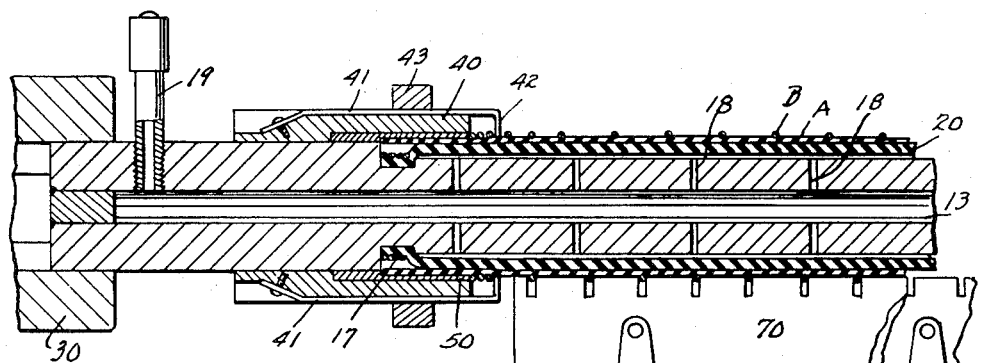

Oct. 3, 1950     R. E. ROBERTS     2,524,679
METHOD OF MAKING FLEXIBLE TUBES
Original Filed June 19, 1944     4 Sheets-Sheet 1
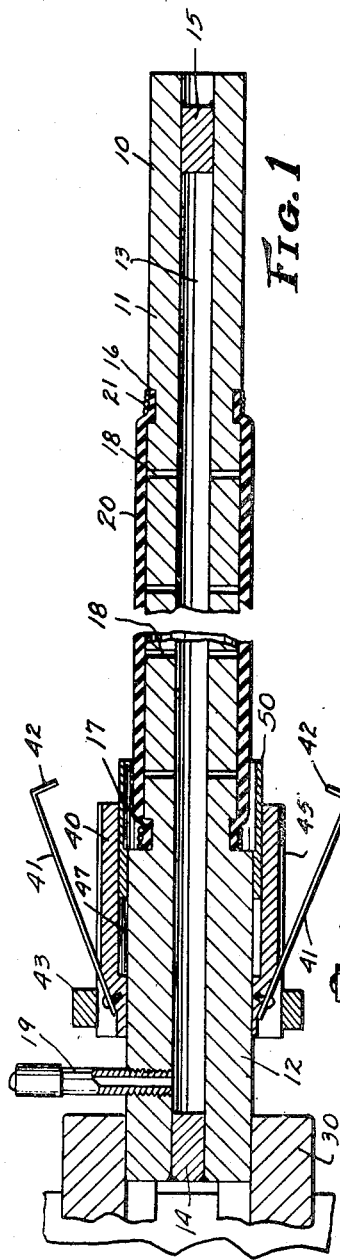
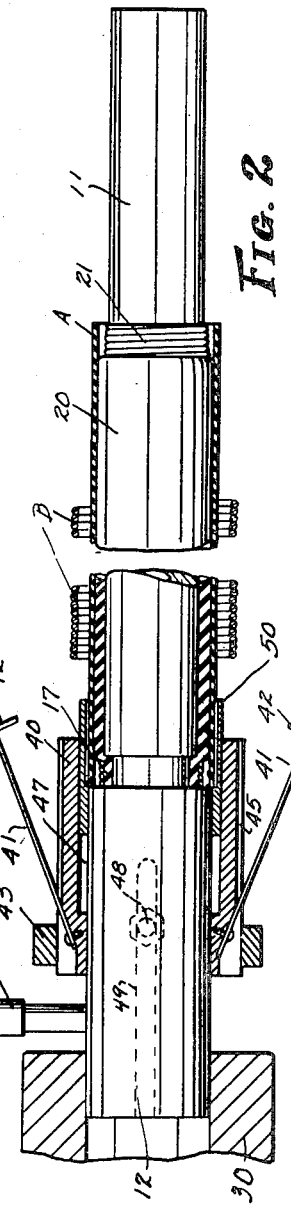
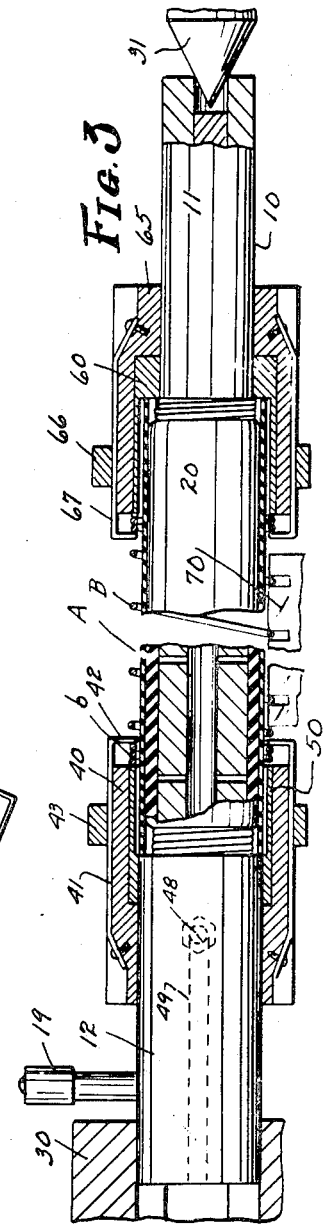
INVENTOR.
Robert Eldon Roberts,
BY Bates, Teare & McBean
Attorneys INVENTOR.
Robert Eldon Roberts
BY
Bates, Teare & McBean,
Attys Oct. 3, 1950 R. E. ROBERTS 2,524,679
METHOD OF MAKING FLEXIBLE TUBES
Original Filed June 19, 1944 4 Sheets-Sheet 3
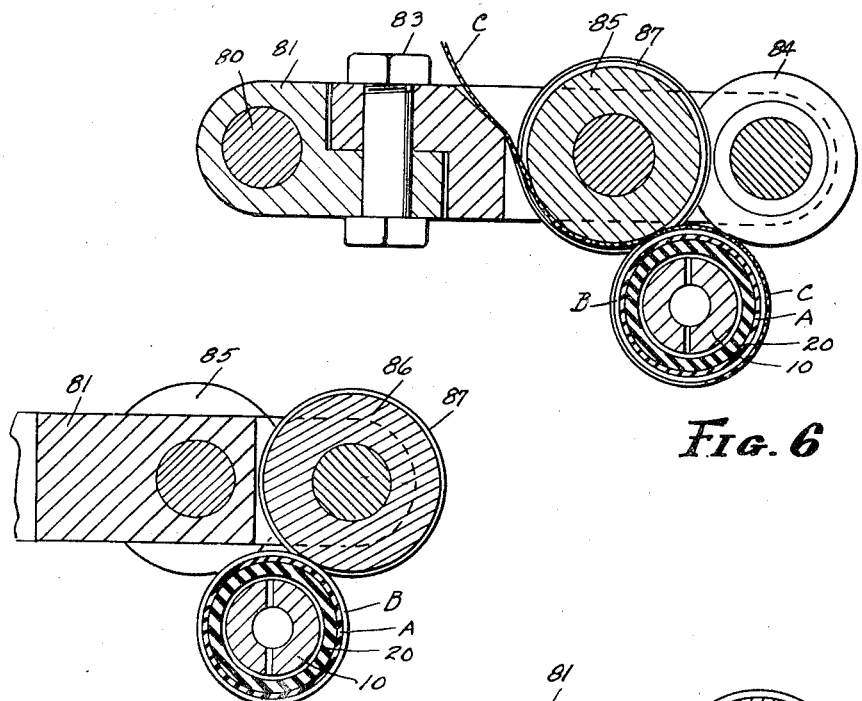
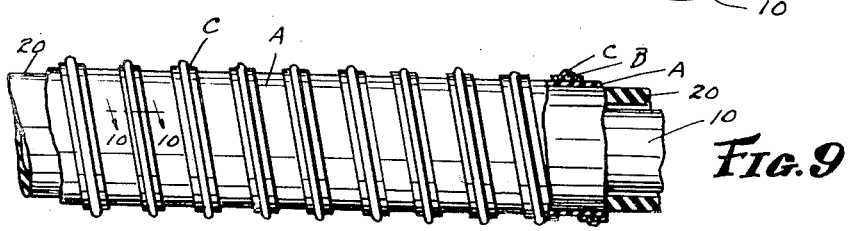
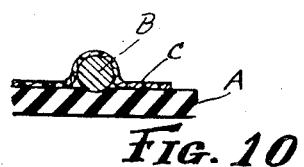

Oct. 3, 1950   R. E. ROBERTS   2,524,679
METHOD OF MAKING FLEXIBLE TUBES
Original Filed June 19, 1944   4 Sheets-Sheet 4

INVENTOR.
Robert Eldon Roberts
BY
Bates, Teare & McBean
Attorneys

Patented Oct. 3, 1950

2,524,679

UNITED STATES PATENT OFFICE 2,524,679

METHOD OF MAKING FLEXIBLE TUBES

Robert Eldon Roberts, Ridgefield, Conn.

Original application June 19, 1944, Serial No. 541,101, now Patent No. 2,486,763, dated November 1, 1949. Divided and this application November 13, 1944, Serial No. 563,280

3 Claims. (Cl. 154—8)

This application is a division of my copending application 541,101, filed June 19, 1944, entitled Apparatus for Making Flexible Tubes, which issued as U. S. Patent No. 2,486,763 on November 1, 1949. The present invention is concerned with a method of making such tubes, which may or may not employ the apparatus claimed in said parent application.

The tube which may be made by carrying out the method of this application has an inwardly and outwardly corrugated flexible wall reinforced by a helical member surrounding the axis of the tube and contained in the wall thereof so that the tube while non-collapsible may be axially stretched or compressed or flexed in any direction.

This method may well be employed in producing the flexible non-collapsible tubes shown, described and claimed in the copending application of Fred T. Roberts, No. 481,407, filed April 1, 1943, now Patent 2,396,059, issued March 5, 1946. A preferred form of such a tube comprises an inner yielding impervious tubular member; an embracing helical spring stretched from its normal condition but less than to its elastic limit, so that it is further extendable or compressible; a winding of rubberized tape in a helical course covering the turns of the spring, and a final elastic sheath outside of the spring and tape. The wall between successive turns of the spring is diverted inwardly to corrugate the tube leaving the spring at the crest of the outer corrugations.

It is an object of this invention to provide an efficient method for holding the stretched spring in position over the inner tube during manufacture; also an efficient method of effecting a snug engagement between the inner tube and the surrounding spring during manufacture; likewise an efficient method of placing a spiral winding of rubberized tape or similar material over the positioned coils of the spring and firmly binding such tape to the tube, and finally an efficient method of readily releasing the carcass, comprising the inner tube, stretched spring and surmounting tape, as formed, so that it may be transferred to another position for action on it by different instrumentalities to corrugate the tube and finally effect vulcanization.

In explaining my method in detail, I have employed the same drawings as appear in my parent application mentioned, which show my tube in different stages of manufacture in connection with the apparatus claimed in such parent application, and I will describe such apparatus in connection with the description of the method. It should be understood, however, that the method may be carried out by a different character of apparatus.

Figure 5:
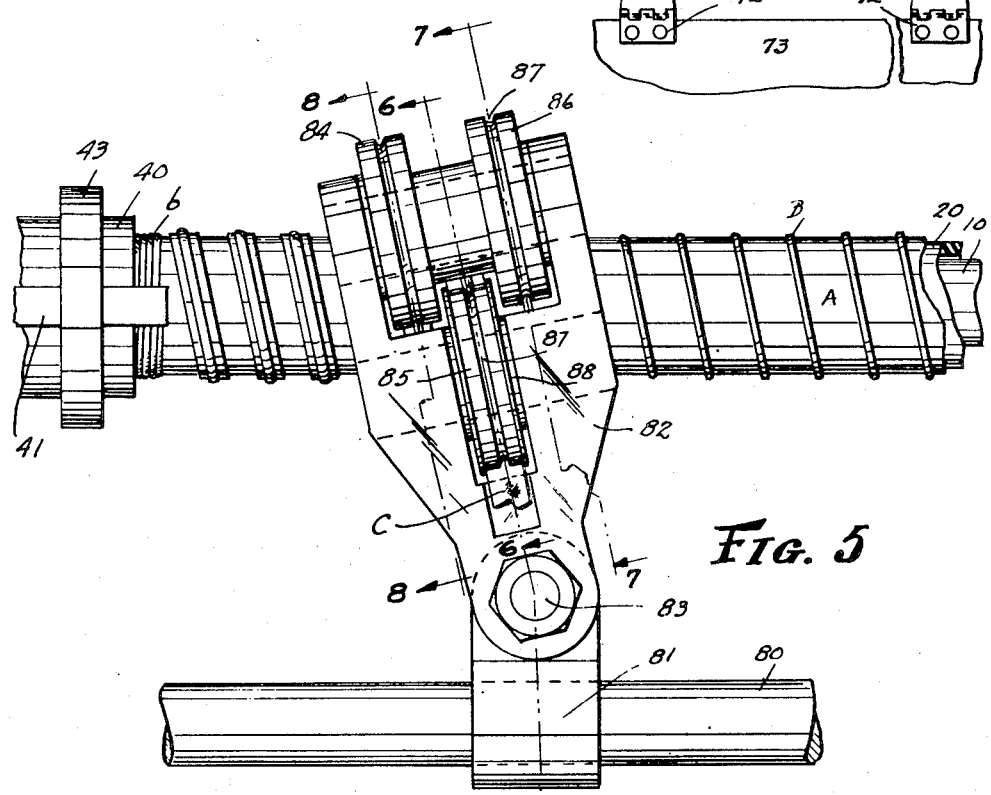
Figure 11:
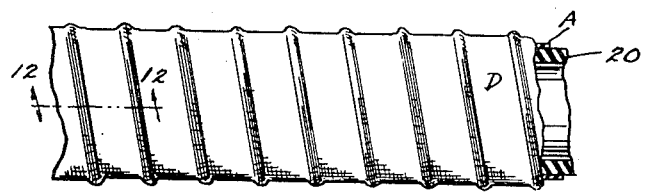
Figure 12:
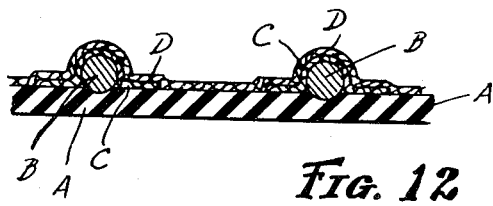
Figure 13:
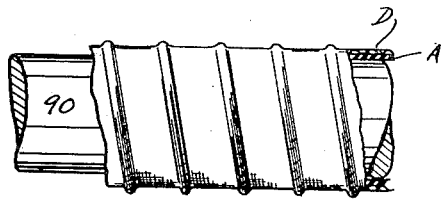
Figure 14:
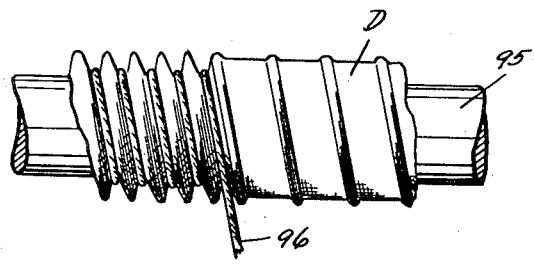
Figure 15:
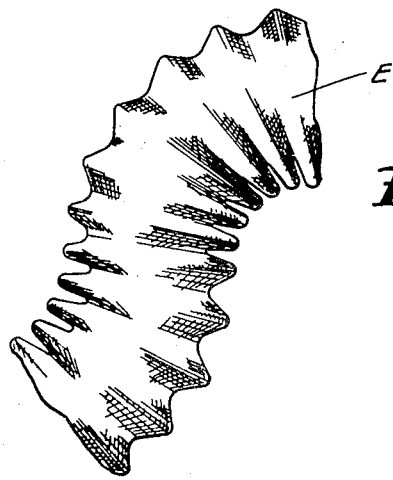

In the drawings, Fig. 1 is an axial section through a portion of an apparatus comprising a pneumatic mandrel and clamping by means of which the first steps of the method may be carried out; Fig. 2 is a sectional side elevation of the same apparatus with the foundation tube in place thereon and an unstretched coil spring loosely surrounding the same; Fig. 3 is a view similar to Figs. 1 and 2 illustrating the conditions after the coil spring has been stretched to position it about the foundation tube; Fig. 4 is a fragmentary view of the left hand portion of Figs. 1 and 3 illustrating the conditions after the pneumatic mandrel has expanded; Fig. 5 is a plan of the tube mounted on the mandrel and having the spring applied and partially surmounted by a helical course of tape, this view showing also an apparatus for applying the tape; Figs. 6, 7 and 8 are details in vertical section of portions of the apparatus shown in Fig. 5, the sections being taken on the correspondingly numbered lines on that figure; Fig. 9 is an elevation, partly in section, illustrating the condition of the tube after the tape has been applied; Fig. 10 is a detail in enlarged cross section through one of the turns of the spring, the adjacent portion of the foundation tube and tape, the location being illustrated for instance by the line 10—10 on Fig. 9; Fig. 11 is a view similar to Fig. 9 showing the same reinforced tube after a sheath of stockinet has been placed about the taped coils; Fig. 12 is a detail in enlarged section through two adjacent turns of the carcass in Fig. 11, as indicated for instance by the line 12—12 in that figure; Fig. 13 is a view illustrating the tube of Fig. 11 after it has been removed from the pneumatic mandrel of that figure and placed on a metal mandrel for a slight preliminary vulcanization; Fig. 14 is a side elevation illustrating the carcass of Fig. 13 placed on a still smaller mandrel and in the act of having the corrugations formed by a helical winding of cord pressing the tube against the mandrel; Fig. 15 is a perspective of a portion of the finished tube, illustrating its extendability, compressibility and flexibility.

Referring first to Figs. 1 to 5 inclusive, 10 indicates a tubular mandrel rod having a body portion 11 in cylindrical form and a cylindrical head portion 12 of greater diameter. An axial bore 13 extends through this member but is plugged adjacent the ends of the member, the plugs being indicated at 14 and 15 in Fig. 1. Surrounding the intermediate portion of the body 11 of this hollow mandrel is a rubber tubular member 20, the ends of which extend into annular recesses 16 and 17 in the body 11 in which such ends are clamped, by embracing wire windings 21. Radial passageways 18 extend from the bore 13 outwardly to the interior of the embracing tubular member 20. From this it will be seen that compressed air admitted to the interior bore of the metal mandrel (through a filling nipple 19 having a check valve) may expand the yielding tube 20, so that such tube becomes in effect a pneumatic mandrel, to effect the results hereinafter explained.

The head portion of the mandrel 10 is adapted to be mounted in the chuck of a tool similar to an ordinary lathe. Such chuck is indicated at 30 in Figs. 1 to 4, and is adapted to embrace the mandrel tightly enough to support it and to rotate it when the chuck rotates. A removable conical supporting member 31, Fig. 3, corresponding to the tail stock of a lathe, may be supplied and may enter an axial recess in the mandrel at the other end from the chuck.

In Figs. 2, 3 and 4, A indicates a rubber tube which is to form the foundation of my reinforced tube. This foundation tube may be manufactured in any suitable manner and is partially cured so that it may be readily drawn over the unexpanded pneumatic mandrel 20 into the position shown in Fig. 2, it being understood that the tail stock would be moved to idle position to allow the foundation tube to be drawn over that end of the mandrel while the head of the mandrel is in the chuck.

B in Fig. 2 indicates a helical spring preferably of steel, which is placed in a comparatively closed condition about the foundation tube on the pneumatic mandrel. After this has been effected, I stretch the spring and anchor its two ends. This may be done by employing two clamps, mounted on the metal mandrel 10, as will now be described.

One of the clamps mentioned is shown in Figs. 1 to 5 as comprising a sleeve 40 slidable on the head portion 12 of the mandrel and carrying a pair of diametrically opposed spring arms 41, each having an inwardly extending hooked end 42. A ring 43 slidably mounted on the exterior of the sleeve 40 may be moved across the spring arms to bend them inwardly so that they lie in longitudinal grooves 45 in the sleeve 40, as indicated in Fig. 3. In this position the inwardly bent ends 42 of the spring arms may engage coils of the spring to anchor it.

It is desirable to leave a portion of the foundation tube A at each end thereof uncovered by the spring so that such end portions are available for bushings or other fittings desired for the ends of the tube. To provide for this, a thin cylindrical sleeve 50 may be mounted on the head 12 of the mandrel, the sleeve 40 having an annular recess 47 for this tubular shield. The bore in the shield is somewhat enlarged beyond the portion which rides on the mandrel head. Thus a recess is provided into which the foundation tube may extend.

After the foundation tube has been placed on the pneumatic mandrel, the shield 50 may be shifted axially to overlie the end portion of the foundation tube and protect it, as indicated in Fig. 2. The clamping member may be shifted lengthwise to cause the ends 42 to overhang the spring and these ends may then be forced together by movement of the clamping ring 43, so that the inwardly projecting ends 42 pass between adjacent coils of the spring and bind two or three turns of the spring between such ends and the end of the shield 50, the parts at that time being in the position shown in Fig. 3. In this position the sleeve 40 is at the limit of its movement on the mandrel, determined by a pin 48 on the sleeve reaching the end of a groove 49 in the mandrel, as shown in dotted lines in Fig. 3. Thus that end of the spring is effectively anchored in the desired position over the foundation tube A, which overlies the pneumatic mandrel 20.

At the time when the tail stock 31 is free from the mandrel, I slide onto the free end of the mandrel another shield 60 and another clamp 65. This shield and clamp may correspond to the shield 50 and clamp 40 heretofore described and have substantially the same external dimensions, though the bore of the shield and clamp are reduced to slide on the narrower portion 11 of the mandrel. The shield 60 is slid into position overhanging that end of the foundation tube and then the clamp 65 is brought into position and its ring 66 slid to force the clamping arms 67 inwardly to engage the endmost coils of the spring and anchor that end, as shown in Fig. 3, whereupon the clamp 65 is clamped tightly to the mandrel.

It is to be understood that before the second clamp just described is applied, the spring has been stretched to the desired open position, which is less than the stretching permitted by the elastic limit of the material of the spring. The stretching, however, allows the coils to be well spaced from each other, as shown in Fig. 3.

To insure an accurate spacing of the spring coils, a suitable gauge may be employed, as for instance the gauge 70, Fig. 3, which is a bar having a series of equi-distant notches having the same spacing as that desired for the spring. This bar is shown as carried by strap hinges 71 (Fig. 4) the other leaves 72 of which are secured to a stationary part 73 of the machine. When the spring has been stretched manually to the desired condition, and the final clamp locked, the gauge may be manually lifted into active position and any particular coil may be manually shifted in one direction or the other, as may be necessary to accurately space all of the coils.

After the spring has been anchored at its ends and equi-distantly spaced over the inner tube, the next step in my method is to expand the tube to cause a tight engagement with the spring throughout its length. This is effected by expanding the mandrel, which may be done by admitting compressed air through the nipple 19, bringing the parts into the condition illustrated in Fig. 4. The comb 70 may be maintained in position during this outward forcing, so that the proper position of the coils is insured as they come to be engaged by the foundation tube, due to the outward action of the pneumatic mandrel.

After the embracing spring has been anchored, and snugly engaged by the foundation tube, thus producing the carcass illustrated in Fig. 4, the next step in my method is to apply the covering for the spring, which is preferably a strip of rubberized tape wound spirally about the coil. Preferably the comb 70 is removed and the chuck 30 is rotated and the rubberized tape applied diagonally so that it lies in a helical course over the spring. The tape may be applied mechanically by the mechanism illustrated in Figs. 5 to 8, about to be described. In any case the tape is wound in a helical course about the tube directly over the spring and adhering to the foundation tube on each side thereof, as such tube and spring are rotated by the rotation of the chucked mandrel.

In Fig. 5, I have shown a frame rod 80, parallel with the mandrel, on which is slidably mounted a block 81 to which is pivoted a yoke 82 by a transverse pivot bolt 83. In the yoke are mounted three grooved rollers 84, 85, 86. The rollers 84 and 86 are on the same axis and may be in the nature of the single spool. These two rollers have cylindrical surfaces each centrally interrupted by an annular groove 87. The roller 85 is placed on an axis parallel with that of the rollers 84 and 86 and nearer the pivot 83 and extends into the space between the rollers 84 and 86. This roller 85 has a cylindrical surface and a central groove 87 and also has edge flanges 88. These flanges are spaced apart a distance slightly greater than the width of the tape which is to be applied by this roller. This tape, having its threads on the bias, is indicated at C in Fig. 5 and comes from a supply not shown and extends onto the underside of the roller 85, and thence across the tube, as about to be explained.

The three rollers are so positioned that their annular grooves are just the same distance apart as the coils of the spring to be covered with tape. The roller 86 is designed to engage a bare coil of the spring and provides means for automatically shifting the laying device as the tube turns on its axis. The roller 85 then overlies the adjacent turn of the spring, and the tape, indicated at C, coming from a suitable supply and preliminarily attached at its free end to the tube, is thus supplied directly to the coil of the spring next to the bare coil engaged by the roller 86. The third roller 84 overlies the third turn of the spring and serves to roll down the tape at opposite sides of a spring coil and effectively bind it to the foundation tube.

It will be seen from Fig. 5 that after the operation has been started the engagement of the foremost roller 86 with the bare coil of the wire spring causes the whole yoke and the parts it carries to be advanced along the tube, while the roller 85 is laying a course of tape over the preceding turn of the spring and the roller 84 is pressing that tape inwardly firmly onto the foundation tube on opposite sides of the wire.

It will be seen that when the tube with its wire coil has been given as many rotations as there are free coils to be covered there will result a tube with each coil covered by a helical course of tape bound down to the foundation tube, as indicated in Figs. 9 and 10.

The next step in my process is to apply over the taped spring a protecting sheath. In effecting this, I remove the tape-applying means and move the tail stock to idle position, and draw a tubular sheath of flexible material over the carcass. It is to be understood that the exterior of the foundation tube and of the applied helical tapes are first covered with cement and then sheath, for instance, a tube of stockinet as shown in the drawing at D, is drawn over the exterior of the taped tube, producing the construction illustrated in Figs. 11 and 12.

At this stage, I wish to give the carcass thus formed a preliminary vulcanization to bind all the parts together. To effect this I release the compressed air from the interior of the pneumatic mandrel (as by opening the valve in the filling nipple 19) so that the mandrel contracts to its original form (as in Fig. 1) and leaves the completed carcass ready for easy removal over the free end of the mandrel. I then slide this carcass onto a metal mandrel 90 which just fits the interior of the tube, as illustrated in Fig. 13, and give the carcass a short vulcanization, just sufficient to bind the parts together. In this vulcanization I may employ a spiral winding cloth between the coils to insure the snug binding of the sheath onto the foundation tube.

I now take the completed carcass, place it on a smaller mandrel, indicated at 95 in Fig. 14, and form corrugations in the tube by winding a coil of heavy cord 96 about the tube between successive reinforced turns. This brings the interior of the tube down tight onto the mandrel 95, leaving the coils of the spring embedded in the outer crests of the tube. The vulcanization of the tube is completed while it is in this condition. Thereafter the tube is removed from the mandrel 95 and it is thus in the condition indicated at E in Fig. 15. It is extendable and compressible and flexible in any direction, as shown in that figure. Whatever bushings or fittings are desired at the ends of the tube are now put in place and the article is thus completed.

It will be understood from the description given that my method employs a length of inner tube (manufactured in any convenient manner); a suitable length of coiled resilient wire-like material; a rubberized tape or similar material; material for final covering, and a quantity of rubber cement. As a result of my method of handling these materials, I produce a corrugated internally reinforced flexible tube which is non-collapsible but may be expanded or contracted or flexed in any direction and which is ready for the insertion of suitable end bushings or other means for mounting according to the use to which the tube is to be put.

I claim:

1. The method of making reinforced rubber tubes comprising holding a stretched wire helical spring over a partially vulcanized tube, expanding the tube to force it outwardly into tight engagement with the wire, then while the tube is in this expanded position cementing a vulcanizable tape about the wire and adjacent portions of the tube, then relieving the expanding pressure, mounting the tube with its reinforcing spring and binding tape on another member smaller than the preceding interior of the expanded tube, binding the tube down onto said member by a helical winding of holding material between adjacent coils of the spring, and completing the vulcanization of the device in this condition.

2. The method of making reinforced rubber tubes comprising placing a foundation rubber tube about an expandable member, placing a wire spring over the tube, expanding said member to force the rubber tube outwardly until the spring is engaged thereby, then while the tube is in this expanded condition placing a binding fabric about the wire and causing it to adhere to the adjacent portion of the tube, then relieving the expanding means, transferring the tube with the reinforcing spring and binding fabric to a solid member, binding it down thereon by a helical winding between the adjacent turns of the spring, and completing the vulcanization of the device in this form.

3. The method of making reinforced rubber tubes comprising placing a foundation rubber tube about an expandable member, placing a stretched wire spring over the tube, anchoring the ends of the spring to hold it in stretched condition, expanding said member to force the rubber tube outwardly until the spring is engaged thereby, then while the tube is in this expanded condition winding a tape spirally over the wire while controlling the position of the tape by means engaging the coiled spring itself, pressing inwardly the margins of the laid tape upon the tube to cause the tape to adhere to the adjacent portion of the tube, applying cement to the exterior of the taped tube, drawing a flexible protecting sheath over the taped tube, then relieving the expanding means, transferring the carcass to a solid support, giving the carcass a sufficient vulcanization thereon to bind the parts together, and thereafter transferring the carcass to a smaller support, binding it down thereon by a helical winding of cord between the adjacent turns of the spring, and completing the vulcanization of the device in this corrugated form.

ROBERT ELDON ROBERTS.

REFERENCES CITED

The following references are of record in the file of this patent:

UNITED STATES PATENTS

| Number | Name | Date |
|---|---|---|
| 132,006 | Harris | Oct. 8, 1872 |
| 323,149 | Holt | July 28, 1885 |
| 459,536 | Simon | Sept. 15, 1891 |
| 1,478,083 | Whitmarsh | Dec. 18, 1923 |
| 1,659,120 | Poberejsky | Feb. 14, 1928 |
| 2,176,762 | Forbes | Oct. 17, 1939 |
| 2,245,758 | Chernack | June 17, 1941 |
| 2,262,514 | Pape | Nov. 11, 1941 |
| 2,321,064 | Broedling | June 8, 1943 |
| 2,430,081 | Roberts et al. | Nov. 4, 1947 |